United States Patent Office 3,105,011
Patented Sept. 24, 1963

3,105,011
ANTIGENS AND PROCESS OF PRODUCING SAME
William McLean, Jr., Grosse Pointe, and Wilton Adair Rightsel, Grosse Pointe Woods, Mich., assignors to Parke, Davis & Company, Detroit, Mich., a corporation of Michigan
No Drawing. Filed June 19, 1961, Ser. No. 117,786
12 Claims. (Cl. 167—78)

This invention relates to antigens and to a process for producing the same. More particularly, the invention relates to a process for propagating infectious hepatitis virus, to fluids containing the virus, to killed infectious hepatitis virus vaccines, to attenuated hepatitis virus vaccines, to antisera, to diagnostic antigens, and to methods for producing the same.

Infectious hepatitis is a relatively common disease. It presents a very acute problem among military personnel because it results in a rather prolonged disability. Outbreaks of the disease have occurred in the military forces in the recent major wars. In spite of the common nature of disease, very little is known of its etiology other than that it is a virus and that the disease is transferred from one human to another. When the disease is transferred from one human to another through blood transfusions, it is commonly called serum hepatitis rather than infectious hepatitis. However, for the sake of convenience the term of "infectious hepatitis" will be used herein as including both the so-called serum hepatitis and the so-called infectious hepatitis. Perhaps the reason that so little is known of this serious disease is that the studies have had to be performed on human subjects because the virus cannot be successfully transmitted to or cultivated in embryonic eggs or laboratory animals such as rodents, monkeys, chimpanzees, canaries and pigs. Attempts have also been made to cultivate the virus in tissue culture but without success. The lack of a method for cultivating the virus has made it impossible to produce a vaccine capable of immunizing against the disease. This lack of a method of cultivating the virus has also made it impossible to devise diagnostic tests for the disease. Such diagnostic tests are of importance especially in determining whether the blood from any given blood donor is likely to infect the recipient of the blood with hepatitis.

At the present time infectious hepatitis is treated by administering gamma globulin. Unfortunately, not all specimens of gamma globulin are of value in the treatment of the disease and at the present time there is no method for determining in advance whether a given specimen of gamma globulin will be effective.

It is an object of the present invention to provide a method for cultivating infectious hepatitis virus to produce aqueous solutions containing a high concentration of the living virus.

It is also an object of the invention to provide diagnostic means to determine whether a given patient has infectious hepatitis or has had the disease in the past.

Another object of the invention is to provide a method for determining whether a given gamma globulin preparation will be effective in the treatment of infectious hepatitis.

Still another object of the invention is to provide a killed infectious hepatitis virus vaccine.

Yet another object of the invention is to provide an attenuated infectious hepatitis virus vaccine.

These and other objects will appear from the description which follows.

In accordance with the invention, aqueous tissue culture fluids containing a high concentration of live infectious hepatitis virus are produced by inoculating a tissue culture of certain special cells with living infectious hepatitis virus, incubating the inoculated culture at a temperature favorable for cell growth for several days and separating the fluid from the solid material present in the culture. The culture fluids so produced can be used as inocula in certain diagnostic or assay tests, described more fully below, or as starting materials for the production of killed vaccine, attenuated vaccine and/or immune serum.

The special cells used in the tissue culture medium can be the Detroit-6 strain of epithelial-like cells or embryonic cells from non-infected human sources. (See Berman et al., Blood, volume 10, pages 896–911, 1955, for a description of the Detroit-6 strain of epithelial-like cells.) The embryonic cells can be those obtained from the various organs of the embryo such as testicles, ovaries, lung, liver, spleen, kidney, skin, intestine and the like or the whole embryo may be used. Post-embryonic tissue can also be used, from infants lacking the autogenic immune response such as is normally developed after the age of about six months. Hence, the term "embryonic cells" as used herein refers not only to embryonic cells as such but also to post-embryonic cells having life following birth for a short period up to about six months. One specific example of embryonic cells which can be used is the strain of spindle cells from human embryonic testicle known as PD 39T. The description of this strain of spindle cells including the description of its method of isolation and cultivation, transfer of the tissue to stationary cultures, the characterizations of the cells in terms of their susceptibility to various viruses, and the cell type, is as follows:

TESTICULAR TISSUES

Method of isolation and cultivation.—Testes obtained from a fetus or at autopsy from an 11-day infant are placed in Hanks' balanced salt solution for two to four hours, minced into pieces approximately 1–3 cubic millimeters in size and roller tubes are prepared by the plasma clot method. Each tube contains about 8 to 10 explants with 2 ml. of a medium composed of 75% Hanks' solution, 20% pooled human serum and 5% chick embryonic extract or of Eagle's basal medium (Eagle, Science, volume 122, pages 501–504, 1955), and 15% fetal bovine serum (Proceedings of the National Academy of Science, U.S.A., volume 44, pages 4–10, 1958). Media changes are made two to three times a week by removing one-half of the original media from each tube and replacing with an equal volume of fresh medium. Outgrowth from the primary explants consists primarily of spindle cells which migrate rapidly after four to eight days of incubation.

Transfer of tissue.—After 13 days the media are removed from the cultures, the cells washed with 2 ml. of Hanks' balanced salt solution and approximately 2.5 ml. of 0.25% trypsin solution at pH 7.4 and 37° C. added to each tube. The tubes are rotated at 37° C. for about 45–60 minutes and the contents of the tubes collected and cooled in an ice bath. The suspension is centrifuged at 4° to 8° C. at 1500 to 1800 r.p.m. for 10–12 minutes and the supernatant discarded. The residual cells are resuspended in an equal volume of nutrient medium (same as that used above) and recentrifuged. This procedure is repeated three times and the third time only one-half volume of nutrient media is used for resuspension. The suspension is diluted to a concentration of 120–200 thousand cells/ml. and this cell suspension used to prepare the stationary cultures. One ml. of the suspension is placed in each tube and after two days' incubation at 37° C., 1 ml. of fresh nutrient medium is added to each tube. After eight days the tubes contain a monolayer of spindle cells and are suitable for use in the practice of the invention.

*Virus spectrum of cells.*—Growth medium is removed from stationary tubes prepared as described above and the cell layer washed with Hanks' solution or with Synthetic Mixture No. 635 (Healy et al., Canad. J. Biochem. & Physiol., volume 32, pages 327–337, 1954), containing 5% horse serum. After three washings 1.5 ml. of maintenance medium [Mixture No. 635 plus 10% horse serum or Synthetic Mixture No. 199 (Morgan et al., Proc. Soc. Exper. Biol. Med., volume 73, pages 1–8, 1950), plus 5–10% fetal bovine serum] is added to each tube. Thereafter 0.5 ml. of solutions, each containing one of the viruses to be tested, are added to the various tubes and the tubes incubated at 37° C. From time to time the tubes are inspected to determine if the cells are susceptible to the viruses being tested. The following results are obtained.

Viruses producing cytopathogenic effect on cells: Time,[1] days

| Virus | Time |
|---|---|
| Adenovirus, type 4, RI–67 | 6 |
| Adenovirus, type 4, RN | 11 |
| Adenovirus, type 2, Ad–6 | 11 |
| Adenovirus, type 3, J.F | 5 |
| Poliovirus, type 1, Mahoney | 2 |
| Poliovirus, type 2, MEF–1 | 2 |
| Poliovirus, type 3, Saukett | 2 |
| Influenza 1233 | 13 |
| Influenza PR–8 | 5 |
| Rabies CVS | 8 |
| Yellow fever, 17D | 6 |
| Eastern equine encephalomyelitis | 2 |
| Herpes HF | 2 |
| Vaccinia | 2 |
| Psittacosis, Borg | 6 |

Viruses producing no cytopathogenic effect on cells:
  Influenza WS.
  Epidemic typhus.
  Adenovirus, type 1.

[1] Time for effect to become apparent.

NOTE.—Cell type—The predominant cell type is fibroblast-like cell.

Another specific example of embryonic cells which can be used is embryonic lung tissue of human origin. Cells of this type are prepared for use as follows:

LUNG TISSUE

*Method of isolation and cultivation.*—In order to obtain sensitive tissue cultures of embryonic lung tissue which are susceptible to the hepatitis virus, it is essential to pretest all media constituents prior to isolation and preparation of the cultures. The most essential constituent to be pretested in human serum. Each unit of human serum is tested on sensitive Detroit-6 cells as follows:

(a) It must be shown to be non-toxic to the cells, to support growth of the sensitive Detroit-6 cells and to permit multiplication to a three-to fourfold increase.

(b) It must be shown to contain no antibodies capable of neutralizing infectious hepatitis virus obtained from the serium of a patient suffering from infectious hepatitis.

(c) It must be shown that the progeny of Detroit-6 cultures cultivated in the serum are sensitive to infectious hepatitis virus obtained from the serum of a patient suffering from infectious hepatitis. Individual serum units which meet these specifications are pooled for use. Commonly a pool of five or more serums is prepared and is found satisfactory for the preparation of media in which to cultivate the sensitive lung tissue.

Lung tissue of a four-month human embryo obtained by a therapeutic abortion is immediately placed in Eagle's medium for two hours and minced into tissue bits approximately one cubic millimeter in size. The tissue bits are extracted with 0.25% trypsin prepared in Hanks' balanced salt solution. The trypsin-dispersed cells are washed three times in a mixture of Eagle's medium plus 20% of pooled, pretested human serum and resuspended in the same mixture at a concentration of about 200 thousand cells/ml. as enumerated by a nuclei count. This cell suspension is inoculated in 1 ml. portions into tissue culture tubes which are then held stationary and in 10 ml. portions into 4 oz. prescription bottles. Medium changes are made two times a week by removing half of the medium from each tube or culture bottle and replacing with an equal volume of fresh medium. Incubation of the tube cultures at 37° C. is continued until there is a development of monolayer, which usually requires 3–4 days. At this time, the cultures are sensitive to the hepatitis virus. The bottle cultures, which are utilized for continuous propagation of the tissue culture cells, are satisfactory for use after two weeks' incubation.

*Transfer of tissue.*—The cells from each bottle culture are separated and washed with Hanks' balanced salt solution, following which 5 ml. of 0.125% trypsin solution is added to each culture. Incubation is then carried out for 20 minutes at 37° C. at pH 7.4. After the trypsin-dispersed cells are cooled in an ice bath, the suspension is centrifuged at 4–8° C. at 1200–1500 r.p.m. for 10–12 minutes. The supernatant liquid is discarded and the residual cells are resuspended in 5 ml. of Eagle's medium plus 20% human serum. The operations of centrifugation and resuspension of cells are repeated two more times following which the cells are suspended in only one-half volume of the nutrient medium. The resuspended cells are diluted to a concentration of 200 thousand cells/ml. and this cell suspension is used to prepare new stock cultures as well as tissue culture tubes for virus studies. Cells prepared in this manner are found to be sensitive to the hepatitis virus.

VIRUS PROPAGATION

As indicated, the special cells described above are used in accordance with the invention for virus propagation by the tissue culture technique: tissue cultures of the cells are prepared, inoculated with living infectious hepatitis virus (either attenuated or unattenuated) and incubated at a temperature favorable for cell growth to provide a fluid containing the propagated virus, and the fluid is separated from the solid material present in the culture. Propagation of the virus in accordance with the invention provides means for obtaining any desired quantity of fluids containing the live virus. It also importantly provides means for attenuating the virus to obtain infectious hepatitis virus vaccines and for diagnosing infectious hepatitis. Such attenuation, described hereinafter in greater detail, is accomplished by serially propagating or passaging the virus in a sufficient number of tissue cultures to reduce the virulence of the virus to the desired level.

The tissue cultures of the special cells can be prepared in the usual manner. The cell strain is cultivated in a suitable physiological medium such as Hanks' balanced salt solution to which pooled human or horse serum and embryonic extract have been added (see Stulberg et al., Proc. Soc. Exper. Biol. and Med., volume 89, pages 438–441, 1955), Eagle's medium (or Mixture No. 199) plus a minor proportion (e.g., 5–40%) of fetal bovine serum, and the like. The cultivation is carried out in sealed containers such as stationary tubes, roller bottles and the like or preferably for large scale production in multi-liter fermentors. After cultivation for a short period, i.e., about 3–6 days, the liquid is removed, the cells are suspended in a nutrient medium such as Mixture No. 199 containing human or horse serum or Eagle's medium, and the suspension is placed in fresh containers. The containers are sealed and incubated at about 37° C. for about 3–7 days. At the end of this time a nearly continuous sheet of cells covers the sides of the containers. The liquid is decanted and the cell layer washed with sterile Hanks' solution containing horse serum or a similar physiological solution. The tissue culture is then ready for inoculation. Preferably, the inoculation is carried out before adding the supportive maintenance medium to the cells.

As an inoculum one may use any fluid containing live infectious hepatitis virus. For example, one may use non-attenuated (virulent) forms of the virus such as serum, plasma or blood containing the virus either in diluted or undiluted form or a tissue culture fluid containing the virus. One may also use a liquid extract of stools, the spleen, liver or bone marrow of infectious hepatitis patients as an inoculum. For the production of attenuated vaccine or antigen, one may use as an inoculum a tissue culture fluid or other fluid containing the virus in attenuated form. In the practice of the invention one can use any of the antigenic types of the infectious hepatitis virus. For example, the antigenic type represented by strain MR-1, the antigenic type represented by strain IHAR-17 or the antigenic type represented by strain IHWW-55 can be used.

As supportive aqueous media for the cells during the incubation period, one may employ a mixture of a synthetic physiological medium or solution such as Hanks' solution, Mixture No. 199, Eagle's medium and other similar media, plus a minor proportion (preferably 5–20% by volume) of human, horse or bovine serum or a serum from other animals of a type possessing a syndesmochorial membrane during pregnancy. In such a mixture fetal serum is preferred. Mixture No. 199 plus 5 to 20% horse or bovine serum, especially fetal bovine serum, has been found to produce excellent results. The use of bovine serum together with a synthetic medium is preferred not only for the support and maintenance of virus propagation, but also for the growth of the special cells prior to inoculation. Hanks' balanced salt solution plus non-human (e.g., horse or bovine) serum and embryonic extract can also be used. When employing the invention as a diagnostic or assay tool, the use of untested human serum in the medium should obviously be avoided.

After inoculation, the inoculated culture is incubated at a temperature favorable for cell growth. Generally speaking, this is at a temperature between 30 and 42° C. and preferably between 35 to 39° C. The time of incubation is not particularly critical, but it should be carried out until the cell monolayer becomes disrupted and numbers of small dark granular cells, irregular in size and shape, are seen to aggregate in clumps with chromatin assuming a marginal position. Generally, this requires several days. In most instances, incubation is carried out for a period of six to fourteen days.

After the incubation has been completed, the fluid containing the live infectious hepatitis virus is separated from the solid material present in the culture. This can be done by filtration through a Seitz filter, a bacterial porcelain filter or a bacterial fritted glass filter, by decantation or by centrifugation. The resulting tissue culture fluid contains a high concentration of live infectious hepatitis virus.

One advantage of the invention is that the virus fluids, either attenuated or non-attenuated, can be prepared not only in small scale using stationary tubes, roller bottles and the like, but also in large scale using multiliter commercial type fermentors. The procedure for large-scale production using Detroit-6 cells is similar to that used for small-scale production and one such preferred example is the following: Detroit-6 cells from stationary or roller bottle cultures, in a volume of two liters at a concentration of about 200 thousand cells per ml. are placed in a 7.5-liter fermentor (New Brunswick Scientific Company, New Brunswick, N.J.), together with 3.5 liters of Eagle's medium containing 10% fetal bovine serum. The culture is incubated at 37° C. for 2–4 days at which time one-fourth of the total volume of liquid is withdrawn and replaced with fresh medium. Incubation is then continued until 6–8 days have elapsed at which time one-fourth of the total volume is again withdrawn and replaced with fresh medium. The resulting culture is then inoculated with sufficient fluid containing infectious hepatitis virus, either attenuated or non-attenuated, to give a concentration of 100–1000 $TCID_{50}$ of virus per ml. The inoculated culture is incubated further, and by the first or second day after inoculation the culture attains a concentration of 1–1.5 million cells per ml. with viable counts of 80–90%. By the fifth to sixth day after inoculation there is a sharp drop in the number of viable cells with a resulting maximal yield of virus. The virus fluid is then harvested for further use in accordance with the invention.

APPLICATIONS OF LIVE VIRUS FLUIDS

In accordance with the invention, fluids containing live attenuated or non-attenuated virus, prepared as described herein, are useful for the inoculation of other tissue cultures, for the preparation of vaccine, for the assay of gamma globulin, for the preparation of diagnostic antigens, for the inoculation of animals to produce specific antisera, or for the diagnosis of a human serum specimen for evidence of a past history of infectious hepatitis.

When using the aforementioned tissue culture fluids containing live infectious hepatitis virus to determine the suitability of a given gamma globulin preparation for the treatment of infectious hepatitis, one first takes a known amount of the gamma globulin preparation to be tested and dilutes it in a known quantity of saline. From this a series of suitable dilutions (usually twofold from 1:5 to 1:1280) is prepared. Equal volumes of these dilutions and a suitable dilution of the virus (1:10) are mixed. Following one-half hour incubation at approximately 20° C., the mixture is dispensed into tissue cultures of Detroit-6 cells. The tissue cultures are then incubated at 35 to 40° C. for about 9 to 14 days. Each of the tissue cultures is then examined daily to determine whether the infectious hepatitis virus has exerted a cytopathogenic effect upon the Detroit-6 cells of the culture. If so, this indicates that at the particular concentration in the culture the gamma globulin is without effect against the antigenic type of infectious hepatitis virus used in the test. If at the end of the incubation period no cytopathogenic effect on the Detroit-6 cells is noted, it indicatse that at the particular concentration in the culture the gamma globulin is able to neutralize the infectious hepatitis virus. Thus, the aforementioned procedure not only indicates whether a particular gamma globulin preparation is capable of neutralizing the infectious hepatitis virus, but also gives an indication of its potency in this regard.

In a similar manner one can use the aforementioned tissue culture fluids containing live infectious hepatitis virus to determine whether a given person has previously contracted infectious hepatitis. This is accomplished by preparing a tissue culture of Detroit-6 cells and inoculating the culture with a known amount, usually about 0.5 ml., of a mixture containing equal volumes of a suitable serum dilution and a standard virus dilution. The serum is prepared from the blood of the patient under examination and diluted with Mixture No. 199, usually about a 1:5 dilution. A known amount of the serum or diluent thereof is added to a pre-determined, usually equal, volume of the standard virus dilution (1:10) and the mixture used to inoculate the tissue cultures which are then incubated at 35 to 40° C. for nine to fourteen days. If at the end of the incubation period examination of the tissue culture indicates that the virus has exerted no cytopathogenic effect on the cells, the test indicates that the patient has a past history of infectious hepatitis of the same antigenic type. However, if the virus has exterted a cytopathogenic effect on the cells, the patient has no past history of infectious hepatitis of the same antigenic type.

The tissue culture fluids containing live infectious hepatitis virus can also be used in another way to determine whether a given person has previously been infected with infectious hepatitis. This is done by preparing a serum conjugated with fluorescent dye, from the person being studied and reacting the conjugated serum with tissue culture cells containing live infectious hepatitis virus. If fluoroescence is observed in the cells upon ultraviolet microscopy, this is demonstrative of the presence of infectious hepatitis antibodies of the same antigenic type in the serum and a previous history of infectious hepatitis in the patient.

The virus propagation process of the invention is also useful for determining whether a patient may presently by suffering from infectious hepatitis or whether his blood can safely be used for transfusion purposes. This can be done by preparing a culture of Detroit-6 cells and inoculating the culture with serum or a serum diluent prepared from the blood of the patient under examination. The inoculated culture is examined daily and incubated for nine to fourteen days. If a cytopathogenic effect on the Detroit-6 cells is noted, the test indicates that the patient's blood is not suitable for transfusion purposes and that he may be suffering from infectious hepatitis. If no cytopathogenic effect on the cells is noted, the patient is not suffering from infectious hepatitis.

In the foregoing procedures it is also satisfactory to use cultures of embryonic cells from non-infected human sources in place of the cultures of Detroit-6 cells.

This invention can also be used to determine whether a patient is presently suffering from infectious hepatitis, by means of the fluorescent antibody technique. In this procedure, a fluid containing live infectious hepatitis virus prepared according to the methods of this invention is used as an antigen to immunize laboratory animals for the preparation of specific immune serum. This immune serum is conjugated and the conjugated serum used with liver biopsies, obtained from the patient under study. If the resulting preparation exhibits pronounced fluorescence when examined by ultraviolet microscopy, this finding is demonstrative of the presence of live hepatitis virus of the same antigenic type in the liver sections.

PREPARATION OF KILLED VACCINE

In order to prepare a killed vaccine from tissue culture fluids containing live infectious hepatitis virus, one treats the tissue culture fluid with ultraviolet light, chemicals or a combination of the two under such conditions that the infectivity of the virus is completely destroyed but the antigenicity is not unduly impaired. As chemicals one may employ formaldehyde, $\beta$-propiolactone, chlorine or phenol. Since the virus, and the antigenicity thereof, is very resistant to heat, elevated temperatures may be used in the preparation of the vaccines, if desired. The optimum temperature will naturally depend upon the particular agent being employed but, in general, temperatures between 20 and 80° C. can be used. When using $\beta$-propiolactone as the killing agent, either alone or in combination with other agents, it is preferable to use a concentration in the range of 0.001 to 0.0025 g./ml. of tissue culture fluid. When formaldehyde is used as the killing agent, the concentration used is in the range of 1:400 to 1:4000 and the mixture incubated at an elevated temperature for a short period, usually, about one hour. When phenol is used as the killing agent, the amount used is such that a final concentration is in the neighborhood of 0.1 to 0.5%. Ultraviolet light is preferably employed either prior to or subsequent to the application of one of the chemical killing agents. The tissue culture liquid is preferably warmed and then subjected in the form of a thin (i.e., 1–2 microns) film to ultraviolet light in the wave length between 2000 and 3000 Angstrom units for a short time; that is, one or two seconds or less. Particularly good results can be obtained by the use of a centrifugal filmer of the type described in U.S. Patent No. 2,725,482 employing a throughput rate of 200–600 milliliters per minute with an ultraviolet output of 20–30 watts. The resulting vaccines are completely free from living infectious hepatitis virus and are capable of producing immune serum in rabbits or monkeys upon injection. The vaccines can also be used for prophylactic purposes.

PREPARATION OF ATTENUATED VACCINE

In order to prepare an attenuated vaccine from fluids containing live virulent (non-attenuated) infectious hepatitis virus, one subjects the fluid to serial passage in tissue cultures of the special cells, for a sufficient number of passages to reduce the virulence of the fluid to a level such that when administered to humans the fluid provides an immunogenic response without causing untoward or adverse clinical symptoms of the disease hepatitis. The fluid material so passaged and rendered free of solids and bacteria can be used directly as a vaccine without modification. The fluid is capable of producing an immune response when administered by inoculation to humans and yet does not cause disease as does the inoculum from which the virus was derived. The fluid material can also be used as a stock fluid or inoculum for the production of additional amounts of the virus fluid.

The number of passages required for attenuation of the virus varies depending on the particular strain of virus employed. By way of illustration, nine such passages have been found sufficient for one particular strain (IHAR–17) to reduce the virulence and pathogenicity thereof for man. However, with other strains additional passages, in some cases as many as fifty or more, may be required. The fluid used as a starting material may be serum, plasma or blood containing the live virus, either in diluted or undiluted form, or it may be an attenuated or non-attenuated stock fluid containing the virus grown in tissue culture, preferably having an infectivity ($TCID_{50}$) of about $10^{-4}$ to $10^{-5}$. Also, liquid extracts of stools, the spleen, liver or bone marrow of hepatitis patients may be used. The fluid is passaged by introducing it into a tissue culture of one of the special cells prepared as described above together with maintenance medium and the culture is incubated at a temperature between 32–40° C. and preferably about 35 to 39° C. The time of incubation is not critical, but it should be carried out until the cell monolayer becomes disrupted and numbers of small dark granular cells, irregular in size and shape, are seen to aggregate in clumps with chromatin assuming a marginal position. Generally, this requires several days. In most instances, incubation is carried out for a period of six to fourteen days. The fluid is then harvested and transferred, if desired after dilution, to a fresh culture and the process is repeated serially from one culture to another until the desired attenuation is achieved. The solid material contained in the fluid can be removed by decantation, filtration or centrifugation. The resulting fluid vaccine product is both viable and immunologically potent and yet it is apathogenic when administered to humans, as by injection, for prophylactic purposes. The viability of the product can be tested by serially diluting a sample and determining the dilution which will cause cytopathogenic changes in fresh cultures of the special cell. The potency of the prduct is demonstrable by complement fixation. For administration to humans, the fluid product is desirably subjected to bacterial filtration to remove any solids present and to assure bacterial sterility. Filtration may readily be accomplished without loss of infectivity or complement-fixing activity. Prior to use, e.g., for prophylactic purposes or production of immune serum in rabbits or monkeys, the filtered product is ordinarily assayed for potency, infectivity and contamination by bacteria and other viruses. The dosage form for prophylactic purposes will vary depending on the potency and infectivity of the vaccine product. As an illustration of this, a fluid product having an infectivity titer ($TCID_{50}$) of $10^{-6.5}$ for Detroit-6 cells is conveniently used, for subcutaneous inoculation, as a dilution in 100 to 1000 parts by volume of physiological diluent such as saline, and the diluted vaccine is injected in quantities of one to two ml. As will be understood, dilution of any particular concentrated vaccine can be varied as desired to provide the required dosage form. Vaccination can be continued periodically, if necessary, over a period of several months until significant antibody level is obtained.

The invention is illustrated by the following examples:

*Example 1.—Preparation of Tissue Culture Liquids Containing Live Infectious Hepatitis Virus*

A culture of the Detroit-6 strain of cells is cultivated in Hank's solution, plus human serum and embryonic extract as shown in Proc. Soc. Exper. Biol. and Med., volume 89, 438–441, 1955. The two or three day old culture is washed three time with Mixture No. 199 (Morgan et al., Proc. Soc. Exper. Biol. and Med., volume 73, pages 1–8, 1950), containing 10% horse serum.

A serum is prepared from the blood of a patient (MR 1) suffering from infectious hepatitis and the serum diluted up to five volumes with sterile Mixture No. 199 containing 10% horse serum. 0.5 ml. of the diluted serum is added to the tissue culture and the cell layer wet with the inoculum. 1.5 ml. of Mixture No. 199 plus 10% horse serum is added and the culture incubated at 37° C. for about seven days. At the end of the incubation period the cell monolayer has become disrupted and numbers of small dark granular cells have aggregated in clumps with chromatin assuming a marginal position. These granular cells are irregular in size and shape. The liquid is decanted from the culture and filtered through a Seitz or fritted glass ultrafine bacterial filter. The filtrate contains live infectious hepatitis virus and can be used in the assay of gamma globulin preparations, the determination of a past history of infectious hepatitis, the preparation of a killed vaccine, and other purposes. A similar filtrate is made by this method from the serum prepared from the blood of a patient (IHWW-55) suffering from infectious hepatitis, using fetal calf serum in place of human serum (and embryonic extract) and horse serum.

In a similar manner tissue culture fluids containing live infectious hepatitis virus were prepared from the serum of four other patients (SAL, G. Pas, D. Keb and H. Pom) suffering from infectious hepatitis.

Instead of using a serum containinig live infectious hepatitis virus as the inoculum, one may also use a stool suspension. This is accomplished by diluting a stool sample from an infectious hepatitis patient to 100 volumes with sterile physiological saline or Mixture No. 199, centrifuging and using 0.5 ml. of the clear supernatant for inoculation. In this manner, tissue culture fluids containing live infectious hepatitis virus were prepared from the stools of three patients (New, GAR and USA) suffering from infectious hepatitis. Instead of the media employed above for growth and maintenance of the cells, one may use other media such as Mixture No. 199 containing 5–10% fetal bovine serum.

*Example 2.—Assay of Gamma Globulin Using Tissue Culture Fluids Containing Live Infectious Hepatitis Virus*

A series of cultures of Detroit-6 cells is prepared as described in Example 1 and each of the cultures inoculated with 0.5 ml. of one of the tissue culture fluids containing live infectious hepatitis virus (MR 1) prepared in Example 1. A known amount of the gamma globulin to be tested is dissolved in a known amount of sterile water and serial dilutions of the solution prepared. 0.5 ml. of each dilution is added to a different inoculated Detroit-6 cell culture and the resulting cultures incubated at 37° C. for 9–14 days. The cultures were then examined to determine whether the virus exerted a cytopathogenic effect on the Detroit-6 cells. The results of the tests on the sample of gamma globulin are shown in Table 1. Table 1 also shows the results of a similar test run on a different sample of gamma globulin.

TABLE 1

| Dilution of gamma globulin | Gamma globulin, Sample A, cytopathogenic effect | Gamma globulin, Sample B, cytopathogenic effect |
|---|---|---|
| 1:50 | (¹) | + |
| 1:100 | 0 | + |
| 1:320 | 0 | + |
| 1:1000 | ± | + |
| 1:3200 | ± | + |
| 1:10,000 | + | + |
| 0 control | + | + |

¹ Toxic.

NOTE.—0=no cytopathogenic effect. +=cytopathogenic effect. ±=partial cytopathogenic effect.

It will be noted that the gamma globulin of sample B did not demonstrate any ability to suppress the action of the infectious hepatitis virus on the Detroit-6 cells and hence this gamma globulin is unsuitable for use in the treatment of patients suffering from the MR 1 antigenic type of infectious hepatitis. The gamma globulin of sample A on the other hand demonstrated quite a marked ability to suppress the growth of the MR 1 infectious hepatitis virus and hence is suitable for use in the treatment of patients suffering from this antigenic type of infectious hepatitis.

Other antigenic types or isolates of the infectious hepatitis virus can be substituted for the MR 1 strain and other samples of gamma globulin can be used in the above procedure.

*Example 3.—Use of Tissue Culture Fluids Containing Live Infectious Hepatitis Virus to Determine Prior History of the Disease*

Serum is prepared from the blood of the patient (FT) under study and the serum diluted to five volumes with Mixture No. 199. A Detroit-6 cell culture is prepared as described in Example 1 and inoculated with 0.5 ml. of one of the tissue culture fluids containing live infectious hepatitis virus prepared in Example 1 (GAR). 0.5 ml. of the diluted serum is added to the culture, the culture diluted with 1.0 ml. of Mixture No. 199 containing 10% horse serum and the culture incubated at 37° C. for nine to fourteen days. At daily intervals during the incubation period the culture is examined to determine whether the virus has exerted a cytopathogenic effect on the cells of the culture. If not, the patient has a past history of infectious hepatitis of the same antigenic type. If a cytopathogenic effect is noted, the patient has no past history of this antigenic type of disease. The results of this test are shown in Table 2. Table 2 also shows similar tests on other patients and with other tissue culture fluids containing the live hepatitis virus.

TABLE 2.—CYTOPATHOGENIC EFFECT ON CELLS

| Designation of serum dilution 1:5 | Tissue culture fluid PAS | Tissue culture fluid GAR | Tissue culture fluid Keb | Tissue culture fluid MR 1 |
|---|---|---|---|---|
| FT | 0 | 0 | 0 | 0 |
| RK₁ | + | + | + | + |
| RK₂ | + | 0 | 0 | + |
| PS | + | + | + | + |
| HJ | + | + | + | + |

NOTE.—+ indicates cytopathogenic effect on cells. 0 indicates no cytopathogenic effect on cells.

Serum FT was obtained from a person known to have had infectious hepatitis seven years previously. Serums PS and HJ were obtained from persons having no previous history of infectious hepatitis. Serum RK₁ was obtained from a person who had no prior history of infectious hepatitis prior to the taking of the blood sample. Serum RK₂ is the serum obtained from patient RK₁ following the recovery from an illness which occurred during the course of the work.

Example 4.—Vaccine Production

A suspension of Detroit-6 cells is prepared from 100 stock cultures growing on glass in 32-ounce prescription bottles by treating with aqueous solution containing 0.02% ethylenediaminetetraacetic acid. The resulting suspension is added to 24 liters of nutrient medium (Mixture No. 199 plus 20% human serum) to give a suspension containing 60,000 cells/ml. After thorough mixing, the suspension is cooled to 0–5° C. by an ice bath and the cells maintained in uniform suspension with a magnetic stirrer. This suspension is dispensed in 80 ml. aliquots into 300 sterile 32-ounce prescription bottles. The bottles are tightly sealed and incubated at 37.5° C. for 4 days. At this time, the cells have multiplied, giving a nearly continuous sheet covering the sides of the culture bottles (each bottle contains approximately 15 million cells). The cell sheets are washed three times with approximately 100 ml. of sterile Hanks' solution containing 10% horse serum to remove any of the human serum which may contain antihepatitis antibodies. The cultures are now ready for inoculation.

300 washed cultures are seeded by adding 4 ml. of a tissue culture fluid containing live infectious virus (IHAR–17) prepared as in Example 1 and spreading the inoculum over the entire sheet of cells. After incubation for 30 minutes to allow the infection to become started, 36 ml. of a maintenance medium (Mixture No. 199 plus 5% horse serum) is added to each container. The bottles are then incubated at 37.5° C. for 6 days, at the end of which time the cell sheets are disrupted, and some of the cells are disintegrated. The fluids are harvested and pooled. The total yield is approximately 11.7 liters. Samples of the pooled harvest are tested for their viability by diluting a sample and determining the dilution which will cause cytopathogenic changes in fresh cultures of Detroit-6 cells. The suspension of this particular example was capable of causing such cytopathogenic changes at a dilution of $10^{-4}$ or 1:10,000. The potency of the fluid was also tested for its ability to fix guinea pig complement. This particular fluid when diluted to 1:4 was capable of fixing one unit of guinea pig complement in the presence of 2 units of antihepatitis antibody contained in monkey serum (the method of carrying out this complement fixation test is shown in Viral and Rickettsial Infections of Man, edited by Thomas M. Rivers, M.D., pages 72–75, 1948, J. G. Lippincott Company).

11.5 liters of the crude fluid containing the live virus is homogenized by treatment with a vibrating machine or disperser to break up any clumps. The suspension is then clarified by passage through a series of 3 fritted glass candles of graded porosity, the final candle of which has a mean pore diameter of about 0.9 micron. The resultant filtrate is free of clumps of cells and aggregates but still contains the live infectious hepatitis virus. Tests of this filtered fluid show no demonstrable loss of infectivity or complement fixing activity when compared with the crude fluid. Approximately 11.2 liters of clear filtrate is obtained.

Highly purified β-propiolactone is added slowly to 10.5 liters of the filtered fluid at about 4° C. until the final concentration of the β-propiolactone is 0.001 gm. per milliliter. The flask containing the fluid is placed in a 60° C. water bath and the fluid stirred until the temperature in the flask rises to approximately 60° C. During this heating 1/10 normal sodium hydroxide solution is added dropwise to maintain the pH in the range of 6.9 to 7.1, as indicated by the color of the phenol red indicator in the Mixture No. 199. The fluid is heated at 60° C. for an additional twenty minutes and then cooled. At this stage, no residual infectivity of the virus is demonstrated by the usual test in the tubes, but when large volumes (40 ml. in each of 10 culture bottles) are tested, traces of residual infectivity are observed.

To destroy this last trace of infectiousness, the treated fluid is passed through a centrifugal irradiator (as shown in U.S. Patent 2,725,482) at the full rate of 500 ml. per minute, with an ultraviolet output of 20 watts. Approximately 9.1 liters of the vaccine are obtained. Following this treatment, no residual infectiousness for Detroit-6 cells can be detected by repeated tests of 400 ml. samples (40 ml. on each of 10 culture bottles).

Following these treatments, the fluid can be safely handled without danger of contracting hepatitis, but the inactivated fluid is still capable of fixing complement as determined by the method described above at a dilution of 1:2. Thus, a large proportion of the antigenicity of the virus has been retained although its infectivity has been completely destroyed. To demonstrate that immunigenicity has been retained, 5 monkeys were vaccinated, each monkey receiving 1 ml. of fluid into the calf muscle. After 3 such inoculations, at two-week intervals, serum specimens obtained from the animals are capable of neutralizing 10 infectious doses of the MR 1 strain of hepatitis virus when diluted 1:10 to 1:320. A similar experiment in rabbits, utilizing the same lot of antigen, concentrated 10 times by ultracentrifugation gave antibody levels of 1:320 to 1:1000.

In the preparation of a vaccine by any of the methods of this invention, it is satisfactory to use an infectious hepatitis virus filtrate which has been prepared by incubation of the virus in the presence of human embryonic cells such as lung cells or testicular cells, in place of the infectious hepatitis virus filtrate prepared by incubation with Detroit-6 cells.

Example 5.—Preparation of Tissue Culture Liquids Containing Live Infectious Hepatitis Virus Five tubes of a tissue culture of PD39T cells are prepared and inoculated with 0.5 ml. of a 1:5 dilution of a serum from a patient suffering from infectious hepatitis. 1.5 ml. of maintenance solution (Mixture No. 199 plus 5% horse serum) is added to each of the tubes and the cultures incubated at 37.5° C. for ten days. The culture fluids are passed through a bacterial filter having a mean porosity of 0.3 micron to obtain a filtrate containing live infectious hepatitis virus.

Instead of the maintenance medium employed above, one may use other media such as Mixture No. 199 plus 10% fetal calf serum or Eagle's medium plus 15% fetal bouvine serum.

Example 6.—Vaccine Production

Sufficient formalin is added to 1.5 liters of the tissue culture fluid containing live infectious hepatitis virus prepared in Example 4 to give a final concentration of 1:4000. The mixture is heated at 75° C. for one hour. The resulting solution is passed through a centrifugal filmer apparatus of the type described in Example 4 at the rate of 300 ml. per minute using an ultraviolet output of 20 watts. The resulting vaccine contains no live infectious hepatitis virus but possesses antigenicity.

Example 7.—Killed Vaccine Production

Sufficient phenol is added to 500 ml. of the tissue culture fluid containing live infectious hepatitis virus prepared in Example 4 to give a final concentration of 0.5%. The mixture is heated at 70° C. and then passed through a centrifugal filmer such as that referred to in Example 4 at the rate of 200 ml. per minute using an ultra-violet output of 20 watts. The resulting vaccine contains no live infectious hepatitis virus but possesses antigenicity.

Example 8.—Preparation of Tissue Culture Liquids Containing Live Infectious Hepatitis Virus A culture of human embryonic lung cells is cultivated in a mixture of Eagle's medium plus 20% pretested human serium for 3–4 days. The cultures are washed twice with Mixture No. 199 containing 10% horse serum.

An infectious serum obtained from the blood of a patient (MR 1) suffering from infectious hepatitis is diluted to five volumes with sterile Mixture No. 199 containing 10% horse serum. The diluted serum (0.5 ml.) is added to a tissue culture preparation of human embryonic lung cells and permitted to adsorb for 15 minutes at 37° C. To this culture preparation is added 1.5 ml. of Mixture No. 199 containing 10% horse serum and incubation is carried out for 6–14 days at 37° C. As the incubation period progresses, the cell monolayer is observed to become disrupted, followed by retraction of cells, rounding, and the aggregation of small groups of dark, granular cells in clumps. This behavior is characteristic of the cytopathogenic effect produced by an infectious serum. The remaining cells are shaken from the glass wall and the cell suspension is siphoned from the culture vessel and homogenized with a grinder such as a Ten Broeck grinder. The homogenate is subjected to three cycles of alternate rapid freezing and thawing, with the aid of a Dry Ice-alcohol bath. The homogenized cell suspension is then filtered through a fritted glass, ultrafine, bacterial filter. The filtrate contains live hepatitis virus that can be used in the assay of gamma globulin preparations, as a diagnostic antigen, in the determination of past history of infectious hepatitis, in the preparation of a vaccine, or in the preparation of a standard antiserum that can be ultimately conjugated with a naphthalene derivative for use as a diagnostic antiserum.

The foregoing procedure can be carried out satisfactorily using bovine fetal serum in place of human serum or horse serum.

*Example 9.—Preparation of Diagnostic Antiserum Using the Fluorescent Antibody Technique*

A filtrate containing live hepatitis virus (obtained, for example, by the method of Example 8) is used as an antigen to immunize animals. Monkeys and rabbits are suitable for this purpose. The animals are inoculated intravenously with 1-ml. doses of the live virus filtrate two times per week for eight inoculations. Two weeks after the last inoculation, the animals are bled and the serum used for subsequent conjugation. These serums can be conjugated with 5-dimethylamino-1-naphthalenesulfonyl chloride following the method of Coons:

Journal of Experimental Medicine, 91: 1–13, 1950
Proc. Soc. Exper. Biol. and Med., 47: 200–202, 1941
Journal of Experimental Medicine, 98: 13–20, 1953;

or with fluorescein isothiocyanate or other similar dye following the method of Riggs et al., Am. J. Pathol., 34 1081, 1958.

After the conjugation, the serum is incubated at 37° C. for 30 minutes with rat liver acetone extract. Following centrifugation at room temperature, the supernatant liquid obtained is free of non-specific fluorescence. The occurrence of the conjugation reaction can be confirmed by running an electrophoretic chromatogram.

A conjugated serum prepared from the live hepatitis virus in this manner is utilized as a diagnostic antiserum. For this purpose, liver biopsies are made and placed on slide cultures which are then dried in an incubator at 37° C. The slides are then washed and allowed to stand in cold acetone for 2 minutes. The acetone is removed by washing with 0.9% sodium chloride and the culture is carefully overlaid with the conjugated serum by means of a capillary pipette and held in a moist petri dish insulated with wet filter paper. The culture is incubated in the petri dish for 30 minutes at 35° C. following which the slides are removed and washed once with Eagle's medium to eliminate excess fluorescent material and once with distilled water to remove sodium chloride crystals. The cover slip cultures are transferred to individual slides with a few drops of buffered glycerin at pH 7 and examined by ultraviolet microscopy. The presence of live hepatitis virus in the liver sections is demonstrated by a finding of pronounced fluorescence in the cultures.

*Example 10.—Determination of Infectious Hepatitis Virus Antibodies in Human Serum Using the Fluorescent Antibody Technique*

Serum is prepared from the blood of the patient under study and conjugated with 5-dimethylamino-1-naphthalenesulfonyl chloride or other similar dye according to the method of Example 9. After the elimination of non-specific fluorescence by incubation with rat liver acetone extract, the conjugated serum is reacted with tissue culture cells infected with live infectious hepatitis virus prepared as previously described. The appearance of fluorescence in the cells upon examination by ultraviolet microscopy demonstrates the presence of antibodies in the serum and shows a prior history of infectious hepatitis in the patient being studied.

*Example 11.—Killed Vaccine Production*

A suspension of Detroit-6 cells is prepared from 200 stock cultures growing on glass in 32-ounce prescription bottles by treating with an aqueous solution containing 0.02% ethylenediaminetetraacetic acid. The resulting suspension is added to 30 liters of nutrient medium (Eagle's medium plus 15% fetal bovine serum) to give a suspension containing 200,000 cells per ml. After thorough mixing, the suspension is cooled to 0–5° C. in an ice bath and the cells maintained in uniform suspension with a magnetic stirrer. This suspension is dispensed in 100 ml. aliquots into 300 sterile 500-ml. reagent roller bottles. The bottles are tightly sealed and incubated with rotation at 37.5° C. for four days. At this time the cells have multiplied, giving a nearly continuous sheet covering the side of the culture bottles (each bottle contains approximately 50 million cells). The cell sheets are washed three times with approximately 100 ml. of sterile Hanks' solution and the cultures are now ready for inoculation.

Three hundred washed cultures are seeded by adding 10 ml. of a tissue culture fluid (1000 TCID$_{50}$) containing live infectious virus (IHAR–17) prepared according to Example 1 from serum and spreading the inoculum, by rotation of the bottles, over the entire sheet of cells. After incubation for 30 minutes to allow the infection to become started, 90 ml. of a maintenance medium (Mixture No. 199 plus 10% fetal bovine serum) is added to each container. The roller culture bottles are then incubated at 37.5° C. for 8 days, at the end of which time the cell sheets are disrupted, and some of the cells are disintegrated. The fluids are harvested and pooled. The total yield is approximately 30 liters. Samples of the pooled harvest are tested for their viability by diluting a sample and determining the dilution which will cause cytopathogenic changes in fresh cultures of Detroit-6 cells. The suspension of this particular example was capable of causing such cytopathic changes at a dilution of $10^{-8}$ or 1:100,000,000. The potency of the fluid was also tested for its ability to fix guinea pig complement. This particular fluid when diluted to 1:2 was capable of fixing 4 units of guinea pig complement in the presence of 4 units of antihepatitis antibody contained in rabbit serum. The method of conducting this complement-fixation test is shown in Diagnostic Procedures for Virus and Rickettsial Diseases, 2nd ed., 1956, p. 254, American Public Health Association, New York.

The 30 liters of the crude fluid containing the live virus is homogenized by sonic oscillation to completely disrupt the few remaining intact cells. The suspension is then clarified by passage through a series of filters, such as Millipore filters ranging in pore diameter from 5.0 to 0.45 m$\mu$. The resultant filtrate is free of cells but still contains viable infectious hepatitis virus. Tests of this filtered fluid show no demonstrable loss of infectivity or complement-fixing activity when compared to the crude fluid. Approximately 28 liters of clear filtrate are obtained.

The infectious virus is then inactivated with formaldehyde. A stock purified formaldehyde solution at a concentration of 1:10 (aqueous) is added slowly to 28 liters of the filtered fluid at about 37° C. until the final concentration is 1:400 by volume. The pH is adjusted by the addition of 0.1 N NaOH with neutrality maintained at a range of pH 6.9 to pH 7.1, as indicated by the color of the phenol red indicator in Mixture No. 199. The flask containing the fluid is placed into a 37° C. incubator and gently agitated for 48 hours.

The treated fluid is passed through a centrifugal irradiator (as shown in U.S. Patent 2,725,482) at a flow rate of 500 ml. per minute, with an ultraviolet output of 25 watts. Approximately 26 liters of the vaccine are obtained. Following this treatment with ultraviolet light a stock 35% aqueous solution of sodium bisulfite is added to neutralize the formalin, but leaving a residual of formaldehyde at a concentration of 1:8,000. After this treatment, no residual infectiousness for Detroit-6 cells can be detected by repeated tests of 400 ml. of dialyzed samples (40 ml. on each of 10 culture bottles).

Following these treatments, the fluid can be safely handled without danger of contracting hepatitis, but the inactivated fluid is still capable of fixing complement as determined by the method described above at dilution of 1:2. Thus, a large proportion of the antigenicity of the virus has been retained although its infectivity has been completely destroyed. To demonstrate that immunogenicity has been retained, 5 monkeys are vaccinated, each monkey receiving 1 ml. of fluid into the calf muscle. After 3 such inoculations, at two week intervals, serum specimens obtained from the animals are capable of neutralizing 10 infectious doses of the IHAR-17 strain of hepatitis virus when diluted 1:10 to 1:320. A similar experiment in rabbits, utilizing the same lot of antigen, concentrated 10 times by ultracentrifugation gives antibody levels of 1:320 to 1:1000. For the production of other infectious hepatitis vaccines, one can follow the foregoing procedure using a different type of inoculum, e.g., a tissue culture fluid containing 1000 $TCID_{50}$ of the IHWW-55 strain of infectious hepatitis virus.

maintenance medium (90% Mixture No. 199 and 10% horse serum) is added to each culture. The virus is incubated at 37.5° C. with rotation for one or more days (at which time cytopathogenic degeneration occurs), while maintaining the culture on the alkaline side (pH 7.2–7.6) by periodic adjustment. The fluid containing the live virus is harvested free of cells and a 0.5-ml. aliquot is seeded into a fresh series of stationary culture tubes of Detroit-6 cells for further cultivation of the virus using the same volume per tube of maintenance medium and the same conditions of cultivation as used in the original cultures. Cultivation is continued until maximal propagation of fresh virus as evidenced by cytopathogenic degeneration of the cells. The virus fluid is then harvested and the process is repeated serially from one set of culture tubes to another using diluted or undiluted harvest fluid, through a total of nine passages. At this point the virus contained in the resulting harvested fluid has become attenuated as the result of the series of passages, and is suitable, preferably after bacterial filtration, for administration as a vaccine. This material is referred to as a 9-passage vaccine. One lot of 9-passage vaccine, $TC_9A$, when filtered, diluted 1:100 to 1:1000 with saline, and administered subcutaneously to humans in a dosage of 2 ml. causes the production of protective antibodies for infectious hepatitis of the same antigenic type and yet does not cause symptoms of the disease. The 9-passage material is also suitable for the production of further quantities of virus fluid and for this purpose serial passage of one lot ($TC_9B$) of the virus is continued for six additional passages in roller tubes for a sum total of 15 passages. The resulting material, referred to as a 15-passage vaccine, when filtered, diluted 1:100 to 1:1000 with saline, and administered subcutaneously to humans in a dosage of 2 ml. causes the production of protective antibodies for infectious hepatitis of the same antigenic type and does not cause symptoms of the disease. The details of passage, including the specific media used for growth and maintenance of cells, the inoculum used, the period of incubation, the volume harvested, the harvest designation and the infectivity titer at harvest are given below in Table 3.

TABLE 3

| Reference No. | Growth medium | Maintenance medium | Inoculum used (0.5 ml.) | Period of incubation (days) | Volume (ml.) of fluid harvested | Harvest designation | Infectivity titer at harvest |
|---|---|---|---|---|---|---|---|
| 0 | 60% Hanks',[1] 40% Hu. S.[3] | 90% 199,[2] 10% Ho. S.[4] | | | | | |
| 1 | do | do | Original serum | 1 | 38 | $TC_1$ | $>10^{-2}$ |
| 2 | do | do | $TC_1$ | 4 | 8 | $TC_2$ | $>10^{-1}$ |
| 3 | do | do | $TC_2$ diluted 10:1 | 10 | 16 | $TC_3$ | $10^{-1.33}$ |
| 4 | do | do | $TC_3$ diluted 10:1 | 9 | 32 | $TC_4$ | $>10^{-3}$ |
| 5 | 85% Eagle's,[5] 15% F.C.S.[6] | 90% 199, 10% F.C.S. | $TC_4$ | 10 | 40 | $TC_5$ | $>10^{-6}$ |
| 6 | do | do | $TC_5$ diluted 10:1 | 5 | 40 | $TC_6$ | $>10^{-1}$ |
| 7 | do | do | $TC_6$ | 7 | 50 | $TC_7$ | $10^{-6.5}$ |
| 8 | do | do | $TC_7$ | 9 | 24 | $TC_8$ | |
| 9 | do | do | $TC_8$ | 14 | 26 | $TC_9A$ | $10^{-6.3}$ |
| 10 | do | do | $TC_8$ diluted | 13 | 60 | $TC_9B$ | |
| 11 | do | do | $TC_9B$ | 8 | 72 | $TC_{10}$ | |
| 12 | do | do | $TC_{10}$ | 9 | [7] 120 | $TC_{11}$ | $10^{-7.5}$ |
| 13 | do | do | $TC_{11}$ | 10 | 84 | $TC_{12}$ | |
| 14 | do | do | $TC_{12}$ | 5 | 60 | $TC_{13}$ | |
| 15 | do | do | $TC_{13}$ | 12 | 24 | $TC_{14}$ | |
| | | | $TC_{14}$ | 11 | 58 | $TC_{15}$ | $10^{-8.5}$ |

[1] Hanks'=Hanks' balanced salt solution.
[2] 199=Synthetic mixture No. 199.
[3] Hu. S.=Human serum.
[4] Ho. S.=Horse serum.
[5] Eagle's=Eagle's basal medium.
[6] F.C.S.=Fetal calf serum.
[7] Two 28-oz. bottles used instead of tubes (maintenance medium, 50 ml.; seed, 10 ml.; per bottle).

*Example 12.—Attenuated Vaccine Production*

(*a*) *Production in roller tubes.*—Cultures of Detroit-6 cells are prepared in stationary tubes, by the procedure described in Example 1, using as a growth medium for each tube 2 ml. of a mixture of 60% Hanks' solution and 40% human serum. Each of the cultures is then seeded with 0.5 ml. of a 1:5 dilution of infectious serum [infectivity titer ($TCID_{50}$), $10^{-6.5}$] of a patient (IHAR–17) suffering from infectious hepatitis, and 1.5 ml. of The clarified fluid of the 15th passage, as indicated, contains living attenuated hepatitis virus in aqueous suspension. Tests on this fluid by inoculation into chicken embryos, inoculation into various tissue cultures not susceptible to hepatitis virus, inoculation intramuscularly into guinea pigs and intracerebrally into mice, and inoculation into bacteriological growth media, such as thioglycollate broth, beef heart infusion agar, and blood agar, reveal no contamination by other viruses or bacteria. Infectivity of the attenuated hepatitis virus for Detroit-6 cells is neutralized, in vitro, by specific immune rabbit serum.

Immunological potency of the vaccine is demonstrated by vaccination of monkeys and rabbits with each animal receiving 1.0 ml. of fluid intramuscularly. After 3 such inoculations at weekly intervals, serum specimens obtained from the animals, when diluted 1:10 to 1:320 are capable of neutralizing 10–100 tissue culture infectious doses of infectious and attenuated virus (IHAR–17).

(b) *Alternate production in roller bottles (16th passage).*—Cultures of Detroit-6 cells are prepared from 200 stock cultures growing on glass in 32-ounce prescription bottles by treatment with 20 ml. per bottle of an aqueous solution containing 0.02% ethylenediaminetetraacetic acid. The resulting suspension is added to 30 liters of nutrient medium (Eagle's medium plus 15% fetal bovine serum) to give a suspension containing 200,000 cells per ml. After thorough mixing, the suspension is cooled to 5° C. in an ice bath and the cells maintained in uniform suspension with a magnetic stirrer. This suspension is dispensed in 100 ml. aliquots into 300 sterile 500 ml. reagent roller bottles. The bottles are tightly sealed and incubated at 37.5° C. for 4 days. At this time the cells have multiplied, giving a nearly continuous sheet covering the sides of the culture bottles (each bottle contains approximately 50 million cells). The cell sheets are washed three times with approximately 100 ml. of sterile Hanks' solution and the cultures are ready for inoculation.

The 300 washed cultures are seeded by adding to each, 10 ml. of maintenance medium (Mixture No. 199 plus 10% fetal bovine serum) containing 1000 $TCID_{50}$ of attenuated infectious hepatitis virus from the 15th passage as described in (a). By rotation of the bottles for 30 minutes the inoculum is spread over the entire sheet of cells allowing infection to become started. After absorption of virus into the cells, 90 ml. of a maintenance medium (Mixture No. 199 plus 10% fetal bovine serum) is added to each container. The roller culture bottles are then incubated with rotation at 37.5° C. for 8 days, at the end of which time the cell sheets are disrupted, and some of the cells are disintegrated. The fluids are harvested and pooled. The total yield is approximately 30 liters. Samples of the pooled harvest are tested for their viability by preparing serial dilutions thereof and determining the dilution which will cause cytopathogenic changes in fresh cultures of Detroit-6 cells. The suspension of this particular example is capable of causing such cytopathogenic changes at a dilution of $10^{-6.5}$ or 1:3,200,000. The fluid, diluted one-half and tested for its ability to fix guinea pig complement, is capable of fixing 4 units of guinea pig complement in the presence of 4 units of anti-hepatitis antibody contained in rabbit serum (the method of conducting this complement-fixation test is shown in Diagnostic Procedures for Virus and Rickettsial Diseases, 2nd ed., 1956, page 254, American Public Health Association, New York).

The 30 liters of the crude fluid containing the attenuated virus is homogenized by sonic oscillation to completely disrupt the few remaining intact cells. The suspension is then clarified by passage through a series of filters ranging in pore diameter from 5.0 to 0.45 mu. Approximately 28 liters of clear filtrate are obtained. The resultant filtrate is free of cells, but still contains viable attenuated hepatitis virus. Tests of this filtered fluid show no demonstrable loss of infectivity or complement-fixing activity when compared with the crude fluid.

Cultivation of the virus by the above procedures (a) and (b) can also be carried out using embryonic cells from non-infected human sources instead of the Detroit-6 cells.

This application is a continuation-in-part of our co-pending applications, Serial No. 581,374, filed April 30, 1956, and Serial No. 740,606, filed June 9, 1958, both now abandoned.

What is claimed is:
1. Process for producing an aqueous tissue culture fluid containing live infectious hepatitis virus, which comprises inoculating a tissue culture of the class consisting of tissue cultures of the Detroit-6 strain of epithelial-like cells and tissue cultures of embryonic cells from non-infected human sources with inoculum of the class consisting of live non-attenuated infectious hepatitis virus and live attenuated infectious hepatitis virus, incubating the inoculated culture at a temperature between 30 and 42° C. until the cell monolayer becomes disrupted and aggregates of small, dark granular cells appear, and then separating the fluid from the solid material present in the culture.

2. Process for producing an aqueous tissue culture fluid containing live infectious hepatitis virus, which comprises inoculating a tissue culture of the class consisting of tissue cultures of the Detroit-6 strain of epithelial-like cells and tissue cultures of embryonic cells from non-infected human sources with inoculum of the class consisting of live non-attenuated infectious hepatitis virus and live attenuated infectious virus, incubating the inoculated culture at a temperature between 30 and 42° C. for six to fourteen days and separating the fluid from the solid material present in the culture.

3. Process according to claim 2 wherein the tissue culture is a cell culture of the Detroit-6 strain of epithelial-like cells.

4. Process according to claim 2 wherein the tissue culture is a cell culture of embryonic cells from non-infected human sources.

5. Process according to claim 2 wherein the tissue culture is a cell culture of embryonic lung cells from non-infected human sources.

6. An aqueous tissue culture fluid free from solids and containing live infectious hepatitis virus propogated by incubation of a culture of the class consisting of tissue cultures of the Detroit-6 strain of epithelial-like cells and tissue cultures of embryonic cells from non-infected human sources inoculated with a virus of the class consisting of live non-attenuated infectious hepatitis virus and live attenuated infectious hepatitis virus.

7. An aqueous tissue culture fluid free from solids and containing live attenuated infectious hepatitis virus propagated by incubation of a culture inoculated with attenuated infectious hepatitis virus, said culture being selected from the class consisting of tissue cultures of the Detroit-6 strain of epithelial-like cells and tissue cultures of embryonic cells from non-infected human sources.

8. A vaccine in dosage unit form comprising sterile aqueous tissue culture fluid free from solids and containing live attenuated infectious hepatitis virus propagated by incubation of a culture inoculated with attenuated infectious hepatitis virus, said culture being selected from the class consisting of tissue cultures of the Detroit-6 strain of epithelial-like cells and tissue cultures of embryonic cells from non-infected sources.

9. Process for producing a killed infectious hepatitis virus vaccine which comprises inoculating a tissue culture of the class consisting of tissue cultures of the Detroit-6 strain of epithelial-like cells and tissue cultures of embryonic cells from non-infected human sources with living infectious hepatitis virus, incubating the inoculated culture at a temperature between 30 and 42° C. until the cell monolayer becomes disrupted and aggregates of small, dark granular cells appear, separating the fluid from the solid material present in the culture, and subjecting the fluid containing live infectious hepatitis virus to killing under such conditions that the infectivity of the virus is completely destroyed without undue impairment of the antigenicity of the virus.

10. Process for producing a killed infectious hepatitis virus vaccine which comprises inoculating a tissue culture of the class consisting of tissue cultures of the Detroit-6 strain of epithelial-like cells and tissue cultures of embryonic cells from non-infected human sources with living infectious hepatitis virus, incubating the inoculated culture at a temperature between 30 and 42° C. for six to fourteen days, separating the fluid from the solid material present in the culture, and, under such conditions that the infectivity of the virus is completely destroyed without undue impairment of the antigenicity of the virus, treating the fluid containing live infectious hepatitis virus with β-propiolactone in a concentration between 0.001 and 0.0025 gram per milliliter and thereafter subjecting the resulting fluid in the form of a thin film to the action of ultraviolet light having a wavelength between 2000–3000 Angstrom units.

11. A hepatitis virus vaccine when produced by the process of claim 9.

12. A hepatitis virus vaccine when produced by the process of claim 10.

References Cited in the file of this patent

UNITED STATES PATENTS

| | | |
|---|---|---|
| 2,421,382 | Levinson et al. | June 3, 1947 |
| 2,588,223 | Erickson et al. | Mar. 4, 1952 |
| 2,588,716 | Gochenour et al. | Mar. 11, 1952 |

FOREIGN PATENTS

| | | |
|---|---|---|
| 485,066 | Canada | July 22, 1952 |

OTHER REFERENCES

Sanders et al.: A.M.A. Archives of Pathology, vol. 56, No. 2, "Cultivation of Viruses—Infectious Hepatitis Virus," pp. 187–188, August 1953.

Smolens: "Combined Use of Ultraviolet Irradiation and Beta Propiolactone Sterilization of Sera Infected With a Virus," P.S.E.B.M., vol. 86, No. 3, pp. 538–539, July 1954.

Curran: J. Infectious Diseases, vol. 99, pp. 212–218, November–December 1956.

Flick et al.: "The Activity of Human Reagins Exposed to the Disinfectant, Beta-Propiolactone," Jour. Allergy, 26 (3), pp. 262–267, May 1955.

Lo Grippo et al.: "Antigenicity of B-Propiolactone-Inactivated Virus Vaccines," Jour. Immunology, 75 (2), pp. 123–128, August 1955.

Mack et al.: (I) "Beta-Propiolactone as Virus Altering Agent for Newcastle Disease Vaccine," Poultry Science 34 (5), pp. 1010–1013, 1955.

Mack et al.: (II) "Serological Response in Chickens to Beta-Propiolactone-Treated Newcastle Disease Virus," Proc. Soc. Exp. Biol. and Med. (P.S.E.B.M. #22240), 91 (2), pp. 288–290, February 1956.

D'Alessandro et al.: (I) "Antigenicity of Beta-Propiolactone-Inactivated Poliomyelitis Virus, Type II" (in Italian), Riv. Ist. Sieroterap. Ital. 31 (1), pp. 65–68, January–February 1956.

D'Alessandro et al.: (II) "Further Investigations on the Inactivation of Poliovirus by Beta-Propiolactone" (in Italian), Riv. Ist. Sieroterap. Ital. 31 (6), pp. 464–468 (1956).

McLean et al.: "New Family of Viruses," Science News Letter 70 (13), page 276, Nov. 3, 1956.

Havens et al.: "Infectious Hepatitis and Serum Hepatitis," chapter 27 of "Viral and Rickettsial Infections of Man," 3rd edition, pp. 570–591, ed. by Rivers and Horsfall, published 1959 by J. B. Lippincott Co., Philadelphia, Pa.